Figure 1:
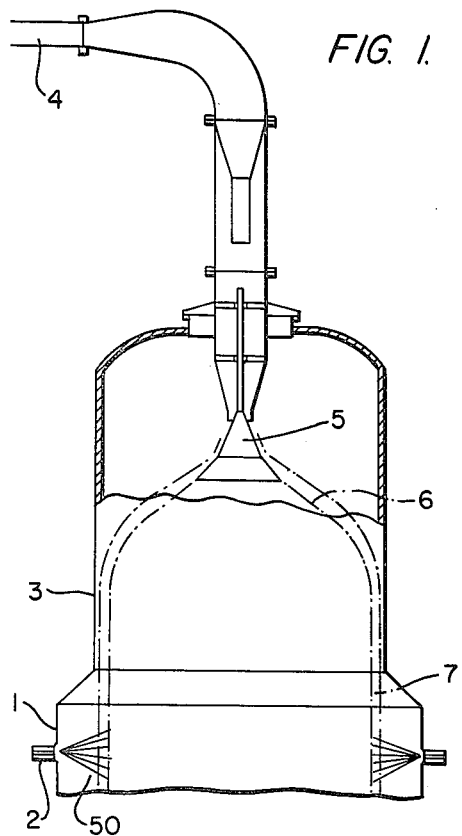

United States Patent [19]

Hilgraf

[11] Patent Number: 4,475,849
[45] Date of Patent: Oct. 9, 1984

[54] DEVICE AND METHOD FOR THE UNIFORM DISTRIBUTION OF A BULK MATERIALS STREAM

[75] Inventor: Peter Hilgraf, Hamburg, Fed. Rep. of Germany

[73] Assignee: Claudius Peters AG, Fed. Rep. of Germany

[21] Appl. No.: 429,256

[22] Filed: Sep. 30, 1982

[30] Foreign Application Priority Data

Oct. 1, 1981 [GB] United Kingdom ................ 8129652

[51] Int. Cl.³ ............................................ B65G 53/40
[52] U.S. Cl. ................................. 406/163; 406/126; 406/195; 414/204
[58] Field of Search ............... 406/163, 124, 126, 192, 406/195, 47, 48, 154, 157, 191; 414/201, 204–206, 299

[56] References Cited

U.S. PATENT DOCUMENTS

1,871,853  8/1927  Kennedy .......................... 406/195 X
2,908,407  3/1956  Armour ............................... 414/204

FOREIGN PATENT DOCUMENTS

2934087  3/1981  Fed. Rep. of Germany ........ 406/48

*Primary Examiner*—Jeffrey V. Nase
*Assistant Examiner*—Daniel R. Edelbrock
*Attorney, Agent, or Firm*—Eric P. Schellin

[57] ABSTRACT

A method and a device for the uniform distribution of a bulk materials stream, particularly one conveyed pneumatically, onto a more extended cross-sectional area possibly divided up into partial stream cross-sections by partitions, is distinguished by the bulk materials stream passing through an elongate vertical charging space, at the end of which it is gathered into a narrowing outlet channel in which the bulk material shows an essentially uniform cross-section distribution and that this bulk materials stream then passes to the tip of a coaxially arranged distribution cone which deflects the bulk material sideways uniformly in all directions and in this way forms a hollow bulk materials curtain of uniform circumferential distribution. This bulk materials curtain can be used as such, for instance in a vessel in which the bulk material is sprayed with liquid, or can be used for the further subdivision into partial streams.

11 Claims, 5 Drawing Figures

DEVICE AND METHOD FOR THE UNIFORM DISTRIBUTION OF A BULK MATERIALS STREAM

DESCRIPTION

This invention concerns a device and a method for the uniform distribution of a bulk materials stream onto a more extended cross-sectional area possibly divided up by partitions into partial stream cross-sections. The invention concerns particularly the distribution of bulk material inside a spray mix vessel in which the bulk material is sprayed with a liquid. The invention concerns further in particular the uniform distribution of a bulk materials stream into a number of partial streams, particularly for the charging of the charging sections of a cyclonic bed, for instance a cyclone-fired furnace.

When moistening a powdery or fine-grained bulk material by spraying in a spray mix vessel in which the bulk material is sprayed with liquid in a falling or rising stream from the direction of the circumference (German Auslegeschrift No. 2,602,454), it is important for achieving a uniform contact of the solid with the liquid that the solid is distributed in a very uniform fashion as seen from the circumference of the vessel. One area of application of the invention is the achievement of this uniform distribution.

Cyclone firing or fluid-bed firing is being employed to an increasing extent for the firing of boilers or furnaces. It is a prerequisite for a uniform combustion of the coal dust which is swirled by the combustion air in the cyclonic bed or maintained in a pneumatically flowable condition in the fluid bed that an equal amount of coal dust is fed to the bed per unit area and unit time at every point. If this is not achieved, then, at the points at which too much coal dust is fed, there is either incomplete combustion or the total firing must be carried out with an excessive amount of excess air. The combustion bed is therefore subdivided into a number of charging sections to which equal amounts of coal dust are separately fed. The separate metering of the coal dust in each of the conveying streams associated with these charging sections is very complex. The invention is therefore based on the further problem of distributing a bulk materials conveying stream uniformly over a more extended cross-section in such a way that a subdivision of this cross-section by partitions leads to a corresponding number of equal-sized conveying streams.

The solution according to the invention consists, in a device for the uniform distribution of a bulk materials stream, of the features that a charging space with an inlet opening and with an outlet channel having converging walls are provided, that the outlet channel opens into the tip of a concentric distribution cone, the conical surface of which has a smaller cone angle near the outlet of the charging space than at a greater distance from it.

In an unconfined arrangement of the distribution cone, the bulk material flows from the distribution cone to all sides in uniform distribution.

Preferably the conical surface of the distribution cone is composed of two successive conical surfaces of different cone angles, the cone angle at the tip being preferably smaller and at the opposite end larger than 60°.

The device suitably includes arrangements for moving the distribution cone in relation to the charging space for the purpose of changing the dimensions of the hollow curtain.

The device also suitably has an essentially circular wall which surrounds the distribution cone (suitably concentrically) and against which the material flowing from the distribution cone impinges, so as to fall from it downwards in uniform distribution along a circle.

The device preferably also includes an arrangement for gathering the bulk materials stream entering the charging space, which arrangement suitably is aligned axially with the outlet channel and which includes converging walls of circular cross-section. This arrangement for the gathering of the bulk materials stream can, according to the invention, be formed by the inlet opening.

If, at least before entry into the charging space, the bulk material is distributed in a gas stream (air stream), as is the case if the fine-grained or powdery bulk material is conveyed pneumatically, the device suitably includes an arrangement for considerably decreasing the velocity of the gas stream, that is to say the velocity of the conveying stream.

According to a further feature of the invention the parts of the distribution cone, which form the two successive conical surfaces of different cone angles, are made in one piece.

The arrangements for moving or setting the distribution cone advantageously include a holding rod which extends through the outlet channel along its central axis, the first cone part being attached to the end of the holding rod. The first part and/or the second part of the distribution cone is preferably formed as a circular cone and, together with the outlet opening, acts to form an annular curtain of uniformly distributed bulk material. However, the distribution cone can also have a base which is other than circular. If the base is e.g. polygonal, then the conical surface is composed of a number of triangles (or trapezoids in the second cone part) in pyramid form, corresponding to the number of sides of the polygon. It can also be arranged that the conical surfaces separated from each other in this way by edges are concave bands, in order to collect the bulk material falling onto it as partial streams and to gather it. In any case the cone should be a right cone, i.e. its central axis should be perpendicular on the surface which contains its bottom end.

The cone angle of the first cone part adjacent to the outlet opening is, according to the invention, of the order of 45° (for instance 30°–55°) and that of the second cone part of the order of 90° (for instance 70°–120°).

If the device is attached to a pneumatic conveying line then it is advantageous if the conveying line is widened in the first instance before reaching the charging space, preferably in the form of a diffuser, in order to then merge into the narrowing arrangement for gathering the bulk materials stream. The widening is advantageous particularly when the conveying line has a bend immediately ahead of the charging space, in which case the widening advantageously includes this bend.

The method according to the invention for distributing the bulk material is, according to the invention, distinguished in that the bulk material is fed to a charging space, that the bulk material is withdrawn from the charging space through an outlet channel with the formation of an essentially uniform bulk materials stream and that the bulk materials stream is directed onto a distribution cone for the formation of a hollow curtain of uniformly distributed bulk material.

The bulk material is preferably distributed in a gas stream prior to entering the charging space (pneumatic conveying).

According to a further feature of the invention the bulk material is introduced into the charging space as an essentially uniformly distributed bulk materials stream through a converging channel.

The velocity of flow of the gas in which the bulk material is distributed (conveying gas) is preferably decreased, before entry into the charging space, by passing the gas stream containing the bulk material through an expansion chamber.

If it is desired to subdivide the bulk materials stream into a large number of separate partial streams, an annular space is advantageously connected after the distribution cone, which annular space has a number of radial partitions corresponding to the number of the partial streams to be formed. The partial cross-sections formed between the partitions can subsequently be made to lead into separate sub-channels.

In every case the elongate charging space with inlet opening and outlet channel as well as the distribution cone are advantageously arranged vertically, it being possible for the direction of flow to be rising or, preferentially, falling. The vertical arrangement avoids distortions of the flow pattern by gravity.

Figure 4:
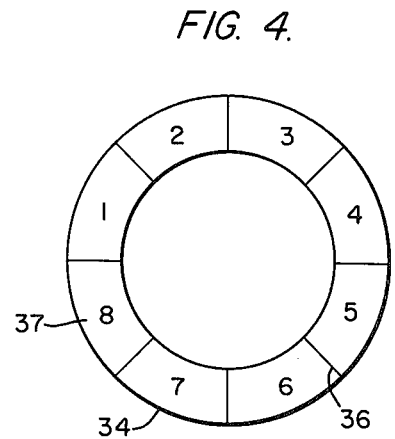
Figure 3:
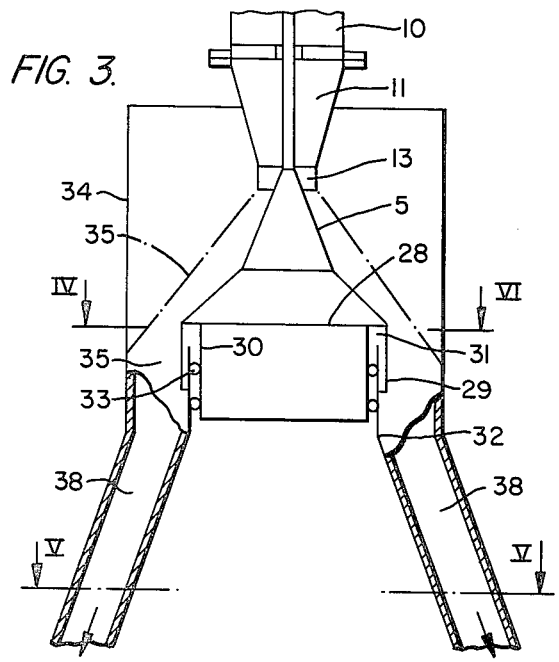
Figure 5:
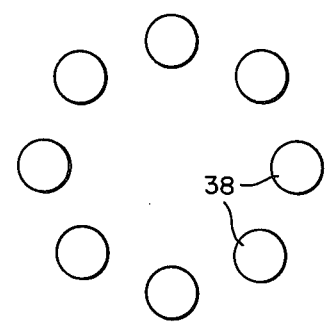

The invention is described in more detail in the text below with reference to the exemplary embodiments shown in the drawings. In these, FIG. 1 shows a device for forming a curtain of circular cross-section from uniformly distributed powdery or fine-grained material at the top of a spray mix vessel, FIG. 2 shows the device according to FIG. 1 on a larger scale, FIG. 3 shows a device for dividing a bulk materials stream into a number of equal partial streams, FIG. 4 shows a section along line IV—IV of FIG. 3 and FIG. 5 shows a section along line V—V of FIG. 3.

According to FIG. 1 a cylindrical vessel 1 placed vertically has a plurality of spray nozzles 2, distributed around its circumference, by means of which powdery or fine-grained bulk material falling down inside the vessel is to be sprayed with a liquid. The upper part 3 of the vessel is also cylindrical and is coaxial to the vessel part 1 but constructed with a smaller diameter. A conveying line 4 for the bulk material conveyed pneumatically in the vessel opens into the top of the latter, the bulk material impinging inside the upper part 3 of the vessel in a vertical stream concentrically on the tip of the distribution cone 5 which deflects the material to the outside so that it flows away uniformly to all sides from the distribution cone 5 in the shape of a conical hollow curtain 6, impinges against the wall of the upper part 3, of the vessel, which is concentric with the distribution cone 5 and then falls downwards in the shape of a cylindrical curtain 7 with uniform circumferential distribution of the solid material.

If the upper part 3 of the vessel were of the same diameter as the vessel part 1 the bulk material curtain 7 would drop directly on the wall of the vessel which would be too close to spray nozzles 2. The spray 50 from the spray nozzles 2 could not sufficiently spread before it strikes the bulk material, and there would be the danger that the moistened bulk material might stick to the spray nozzles 2 in lumps. This is prevented in that the still conical hollow curtain 6 running off the distributor cone pushes against a cylindrical wall whose diameter is smaller than that of the container in which the spraying takes place. The advantage of the arrangement consists in that the spray 50 can fully spread in front of the spray nozzles 2 and only then strikes the dropping bulk material. Thereby not only a larger area of the dropping bulk material is simultaneously struck, but by the impulse of the spray droplets, the struck bulk material particles are deflected in the direction toward the middle of the vessel, so that the particles not yet struck remain farther outside and are therefor struck with greater probability in the further course of the spray. There is a greater chance that all particles of the bulk material are moistened.

Figure 2:
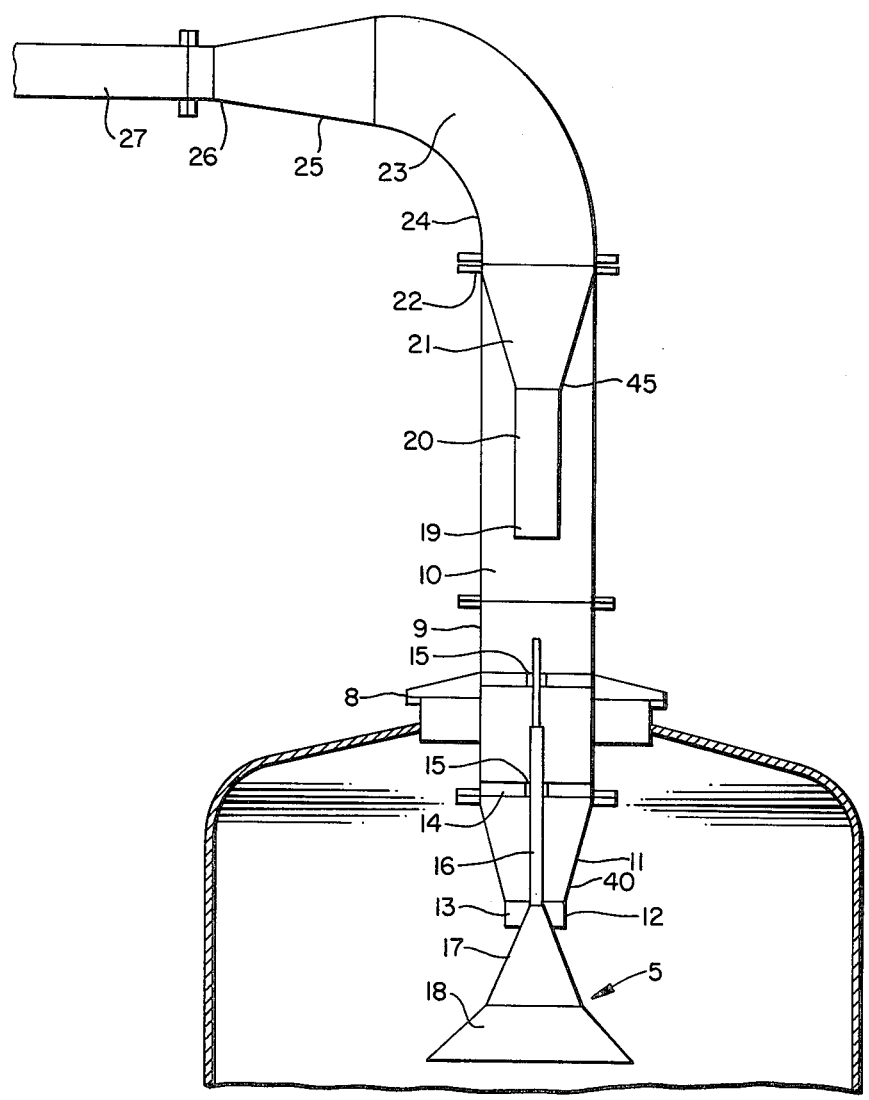

Details of the distribution device follow from FIG. 2. The vessel upper part 3 has a top opening flange forming a vertical and concentric flange connection with a pipe section 9 containing the charging space 10. The upper end of the pipe section 9 forms the inlet opening to be described further below. The lower end of the pipe section 9 is connected with a truncated cone-shaped pipe section 11 arranged coaxially to it, which forms the outlet channel 40 and which opens into an approximately cylindrical end piece 12 which forms the outlet opening 13. The cone included angle of the truncated cone-shaped pipe section 11 is advantageously smaller than 35° and, in the example shown, is 20°. The diameter of the outlet opening 13 is about half as large as that of the pipe section 9, which corresponds to a quarter of the free cross-sectional area. The outlet opening appropriately has a cross-sectional area of from about a third to a sixth of the free cross-sectional area of the charging space.

Inside the pipe section 9 there is a plurality of supporting members 14 in the shape of radial arms which project from two central hubs 15 radially to the pipe wall and are fixed to the latter. Each hub has a bore which is coaxial with the vertical central axis of the charging space. A holding rod 16 extends through the hubs 15 coaxially with the charging space 10, the truncated cone-shaped pipe section 11 and the end piece 12, the length of which rod is such that a lower end piece of the holding rod extends downwards below the outlet opening 13 and that the upper end of the holding rod, provided with a screw thread, extends upwards above the hub 15 of the upper supporting member. This hub contains a suitable screw thread and the threaded part of the holding rod 16 is secured in it by means of a locknut. The length by which the holding rod extends downwards below the outlet opening 13 can be adjusted by loosening the locknut, turning the holding rod and tightening the locknut again.

The distribution cone 5 is fixed to the lower end part of the holding rod 16 as a deflector, its outer surfaces diverging away from the outlet opening 13. The first, upper cone part 17 is aligned coaxially with the outlet channel 40 and extends with its upper part into the outlet opening 13, so that an annular space is formed between the first upper cone part 17 and the inner surface of the outlet opening 13. The distribution cone 5 has furthermore a second, lower cone part 18 which has a larger cone included angle than the first, upper cone part 17 and a greater diameter, so that the second, lower cone part, when compared with the first, upper one is extended outwards and is less steep. In the example shown the cone included angle of the first cone part is 45° and that of the second cone part 90°. Variations are, of course, possible.

If, for the application case of FIG. 2, a distribution of the material is desired which is as wide and as uniform as possible along a vertical length of the vessel which is as small as possible, then an increase of the included angle and of the distribution cone 5 is of great advantage. If, on the other hand, a division into several partial streams is desired according to the example of FIG. 3, then the increase in the included angle can possibly be dispensed with, although even in this connection it is appropriate. The distribution cone can be made relatively easily with an increasing included angle if it is composed of two part cones of different included angles. But it can, of course, also consist of more than two part cones. It is also possible to provide a uniform, curved, smooth increase of the cone included angle. By cone included angle is meant the angle between two diametrically opposite surface lines.

The inlet opening 19 to the charging space 10 is formed by a pipe portion 20, arranged coaxially to the charging space 10, which is attached to the upper flange 22 of the pipe section 9 via a conical pipe section 21, which conically narrows in the direction of flow, so that the conical pipe section 21 and the cylindrical pipe portion 20 protrude concentrically into the charging space 10. The free cross-sectional area of the inlet opening 19 is about 3 to 8 times the size of that of the charging space 10. The upper, open end of the conical pipe section 21 has about the same diameter as the charging space 10. The cone included angle of the conical pipe section 21 lies appropriately between 10° and 35°, at 20° in the example shown.

Further upstream an expansion chamber 23 is attached, which has a circular cross-sectional shape and which is formed from a bent pipe section 24, the diameter of which corresponds approximately to that of the pipe section 9, and a truncated cone-shaped inlet diffuser 25, the narrow inlet end 26 of which is attached with the same diameter to the conveying line 27 attached upstream. The bent pipe section 24 is formed as a pipe bend, but can, of course, also be straight. The cone included angle of the diffuser 25 should be small, in order to achieve a lowering of the velocity of flow of the conveying stream or the conveying gas and in the case shown is about 20°. The inner diameter of the conveying line 27 is at most about half as large as that of the bent pipe section 24 and the pipe section 9. The latter thus have about three to six times, preferably about four times, the free cross-sectional area of the conveying line.

The pipe section 9 protrudes at least with its outlet opening 13 into the upper vessel part 3. The distribution cone 5, too, lies inside the vessel. The inlet end of the charging space 10 lies outside the vessel. The pipe section 9 can be stiffened with struts towards the vessel or towards its flange connected with the vessel.

During operation, powdery or fine-grained bulk material is fed by the conveying air in the conveying line 27 into the expansion chamber 23, a decrease in the air velocity taking place and the solid material inpinging on the inner surfaces of the lower part of the expansion chamber. The bulk material is then pneumatically conveyed into the circular inlet opening 19 where, because of its circular shape, it is gathered away from the inner walls of the charging chamber 10 and near its central axis. Possible influences of the shape of the conveying line or of the expansion chamber 23 ahead of 9 narrowing inlet channel 45 which might cause non-uniformity, are thus removed.

The stream of uniformly distributed bulk material enters the inlet opening 19 of the charging space 10, flows past the supporting members 14 and the holding rod 16 to the outlet channel 40, where because of the shape of the inner surfaces of the outlet channel from the inner walls of the charging space, insofar as it was deflected by impinging on the supporting members and the holding rod, gathered and formed into a stream of uniform distribution (sic). The stream is then conveyed onto the upper part 17 of the distribution cone 5, where, by impinging on its outer surface, it is directed radially outwards and is then further spread out by impingement onto the lower part 18 of the distribution cone 5, until the bulk material impinges onto the cylindrical walls of the vessel upper part 3 or a corresponding cylindrical partition. The stream of bulk material is thus reshaped into an annular curtain with uniform distribution over the circumference.

The dimensions of the curtain, particularly its diameter, can be changed by altering the position of the distribution cone 5 in relation to the outlet opening 13 of the charging space, by which means the inner diameter of the curtain is changed, as well as by altering the diameter of a cylindrical partition provided inside the vessel upper part 3, onto which partition the conically spreading stream impinges, in order to change the outer diameter of the bulk materials curtain which falls down from it as a cylinder. The dimensions of the curtain can further be changed by changing the air velocity with which the bulk material is conveyed.

Instead of connecting an expansion chamber 23 ahead of the charging space 10, the conveying line 27 can also open directly into the charging space 10 instead of the inlet channel 45. However, the expansion chamber 23 produces additional homogenization of the material when entering the charging chamber 10.

Further, it is also possible to feed the bulk material into the charging space 10 other than by pneumatic conveying, although pneumatic conveying is appropriate.

The cylindrical partition onto which the conically spreading bulk materials stream impinges can also be formed from the vessel upper part 3 itself or from a separate partition arranged within it. This can also be connected to the pipe section 9 or to a part connected with it, instead of fixed to the vessel wall 3.

In the embodiment according to FIG. 3 the distribution space 10, its outlet channel 40, the distribution cone 5 as well as its arrangement within the charging space 10 as well as the equipment connected upstream of the charging space 10 are formed exactly as in the case of the exemplary embodiment described above.

At the outlet end 28 of the distribution cone 5 a cylindrical pipe section 29 is connected tightly, concentrically and with equal diameter. With a somewhat smaller diameter and also concentrically a further pipe section 30 is connected, which, with the cylindrical pipe section 29, encloses a cylindrical annular space 31. A lower pipe section 32 protrudes into this annular space from below concentrically without direct contact and is sealed against the further pipe section 30 by means of sealing rings 33. The outlet region of the charging space 10 and of the distribution cone 5 is surrounded by a vessel 34, which, with the lower pipe section 32, encloses an annular space 35. The vessel 34 need not be as large as shown, but can, for instance, also be limited at the top in accordance with the dot-dash line 35'.

According to FIG. 4 the annular space 35 contains a number of radial partitions 36 corresponding to the number of the desired partial streams, which partitions have equal circumferential distance from each other. The segments 37 separated from each other inside the annular space 35 by these partitions merge downwards into the pipelines 38, which, e.g. when charging coal dust to a combustion bed, are allocated to the individual charging sections. The pipelines 38 are tightly connected to the charging space 10, so that the conveying pressure acting from the pneumatic conveying line 27 (FIG. 2) also acts in the further pipeline 38.

Baffles or guide channels can also be provided on the distribution cone 5, which are spatially allocated to the partitions 36 or the segments 37 formed by these. However, this is not a necessity.

The distance between the inlet opening 19 and the outlet opening 13 is appropriately larger than three times the diameter of the inlet opening and/or than twice the diameter of the charging space 10.

The distance between the inlet opening 19 and the start of the narrowing outlet channel is appropriately larger than three times the difference between the diameter of the charging space and the inlet opening 19 plus 0.3 m. This length of the pipe portion 20 of the inlet channel should be equal to or larger than about 5 times its diameter.

The conveying velocities in the conveying line 27 and/or the annular gap of the outlet opening 13 are appropriately greater than 20 m/sec, in particular greater than 30 m/sec.

I claim:

1. A device for the relative uniform distribution of particulate material comprising in sequence:
   (a) first elongated tube;
   (b) first truncated tubular cone, said first elongated tube terminating at the narrower end of said first truncated tubular cone;
   (c) tubular expansion chamber having one end operatively connected to the wider end of said first truncated tubular cone;
   (d) a second truncated tubular cone having its wider end operatively connected to the other end of said tubular expansion chamber;
   (e) second elongated tube having one end operatively connected to the narrower end of said second truncated tubular cone;
   (f) charging tube coaxially disposed at one end portion with said other end of said second elongated tube and having a diameter larger than said second elongated tube;
   (g) third truncated tubular cone having its wider end operatively connected to the other end of said charging tube;
   (h) relatively short tube having one end operatively connected to the narrower end of said third truncated tubular cone and the other end terminating in a downwardly facing opening;
   (i) cone distribution means positioned coaxially below said opening and through said opening to define an annular space between said cone distribution means and said relatively short tube whereby the particular material passes through said annular space.

2. The device of claim 1 wherein the cone distribution means terminates in a vertical cylindrical housing adapted and constructed to receive particulate material from said cone distribution means, said cone distribution means having a skirt depending therefrom; said skirt and said cylindrical housing defining an annular space therebetween.

3. The device of claim 1 wherein the first elongated tube is approximately one half of the diameter of a portion of said tubular expansion chamber.

4. The device of claim 1 wherein said first elongated tube is approximately one half of the diameter of said charging tube.

5. The device of claim 1 wherein said tubular expansion chamber is approximately the same diameter as said charging tube.

6. The device of claim 1 wherein the wider end of said first truncated tubular cone is approximately the same diameter as the wider end of said second truncated tubular cone.

7. The device of claim 1 wherein the wider end of said first truncated tubular cone is approximately the same diameter as said tubular expansion chamber.

8. The device of claim 1 wherein the wider end of said second truncated tubular cone is approximately the same diameter as said tubular expansion chamber.

9. The device of claim 1 wherein said cone distribution means is composed of a first cone part and a second cone part.

10. The device of claim 1 wherein said cone distribution means is adjustably positioned coaxially below said opening by a holding rod means, said holding rod means extends through said third truncated tubular cone and into said charging tube.

11. The device of claim 1 wherein said annular space is made larger or smaller by adjusting the position of the cone distribution means in relation to said opening whereby the amount of particulate bulk material passing through said annular space is controlled.

* * * * *